(12) United States Patent
Liu et al.

(10) Patent No.: US 8,988,392 B2
(45) Date of Patent: Mar. 24, 2015

(54) OPTICAL TOUCH CONTROL SYSTEMS

(75) Inventors: Yun-Cheng Liu, Tao Yuan Shien (TW); Chien-Hung Lin, Tao Yuan Shien (TW)

(73) Assignee: Quanta Computer Inc., Guishan Dist., Taoyuan (TW)

( * ) Notice: Subject to any disclaimer, the term of this patent is extended or adjusted under 35 U.S.C. 154(b) by 255 days.

(21) Appl. No.: 13/494,308

(22) Filed: Jun. 12, 2012

(65) Prior Publication Data
US 2013/0249865 A1    Sep. 26, 2013

(30) Foreign Application Priority Data

Mar. 22, 2012 (TW) .............................. 101109794 A

(51) Int. Cl.
*G06F 3/042* (2006.01)

(52) U.S. Cl.
CPC ................................... *G06F 3/0428* (2013.01)
USPC .......................................................... 345/175

(58) Field of Classification Search
CPC ............ G06F 3/042; G06K 9/00; H04N 7/18; H04N 5/225; H04N 5/262
USPC ................................... 345/175; 348/240, 135
See application file for complete search history.

(56) References Cited

U.S. PATENT DOCUMENTS

| | | | |
|---|---|---|---|
| 2008/0225139 A1* | 9/2008 | Nomura et al. | 348/240.3 |
| 2008/0259052 A1* | 10/2008 | Lin et al. | 345/175 |
| 2011/0063256 A1* | 3/2011 | Ye et al. | 345/175 |
| 2011/0115904 A1* | 5/2011 | Te-Yuan et al. | 348/135 |
| 2011/0199337 A1* | 8/2011 | Tang et al. | 345/175 |
| 2012/0062517 A1* | 3/2012 | Lai et al. | 345/175 |

* cited by examiner

*Primary Examiner* — Dwayne Bost
*Assistant Examiner* — Chineyere Wills-Burns
(74) *Attorney, Agent, or Firm* — McClure, Qualey & Rodack, LLP

(57) ABSTRACT

An optical touch control system is disclosed. A reflector surrounds a monitor. At least one image detection module is adjacent to the monitor and includes an image sensor, a reflective mirror, and a light source. The image sensor is electrically connected to an image processor. The reflective mirror is disposed on the image sensor and inclines to the image sensor by a predetermined angle. The light source outputs light onto the monitor. The reflective mirror reflects the light reflected by the reflector to the image sensor, identifying a touch control operation.

6 Claims, 6 Drawing Sheets

OPTICAL TOUCH CONTROL SYSTEMS

CROSS REFERENCE TO RELATED APPLICATIONS

This application claims priority of Taiwan Patent Application No. 101109794, filed on Mar. 22, 2012, the entirety of which is incorporated by reference herein.

BACKGROUND OF THE INVENTION

1. Field of the Invention

The invention relates to optical touch control systems, and more particularly to optical touch control systems with a reduced thickness or volume.

2. Description of the Related Art

In an optical touch control system, touch control operations are identified by image sensors detecting interception of optical paths.

Referring to FIG. 1A and FIG. 1B, a conventional optical touch control system 1 comprises a monitor 10, a reflector 20, an image processor 30, and two image detection modules 40.

As shown in FIG. 1A, the reflector 20 surrounds the monitor 10. Here, the reflector 20 may be composed of a retro-reflective material for reflecting back incident light along an incident route.

The image detection modules 40 are adjacent to the monitor 10 and oppose each other. Here, as shown in FIG. 1A and FIG. 1B, each image detection module 40 comprises a casing 41, a circuit board 42, an image sensor 43, a filter 44, a plurality of focusing lenses 45, and a light source 46. The casing 41 covers the image sensor 43, filter 44, focusing lenses 45, and light source 46. The image sensor 43 is disposed on the circuit board 42 and is electrically connected to the image processor 30 through the circuit board 42. The filter 44 is disposed between the image sensor 43 and the focusing lenses 45.

During operation of the optical touch control system 1, incident light output from the light source 46 is reflected back by the reflector 20 along the incident route of the incident light and is received by the image sensor 43 sequentially through the focusing lenses 45 and filter 44. Here, by the image sensor 43 detecting interception of an optical path in any position on the monitor 10, identification of touch control can be obtained.

Nevertheless, as shown in FIG. 1B, as both of the circuit board 42 and image sensor 43 of each image detection module 40 are perpendicular to the top surface of the monitor 10, the height of the entire optical touch control system 1 in a Y direction (i.e. the thickness of the entire optical touch control system 1) can hardly be reduced, significantly limiting development for further thinning the entire optical touch control system 1.

BRIEF SUMMARY OF THE INVENTION

A detailed description is given in the following embodiments with reference to the accompanying drawings.

An exemplary embodiment of the invention provides an optical touch control system comprising a monitor, a reflector, an image processor, and at least one image detection module. The reflector surrounds the monitor. The image detection module is adjacent to the monitor and comprises an image sensor, a reflective mirror, and a light source. The image sensor is electrically connected to the image processor. The reflective mirror is disposed on the image sensor and inclines to the image sensor by a predetermined angle. The light source outputs light onto the monitor. The reflective mirror reflects the light reflected by the reflector to the image sensor, identifying a touch control operation.

The image detection module further comprises a casing and at least one focusing lens. The casing covers the image sensor, reflective mirror, and focusing lens. The focusing lens is adjacent to the reflective mirror. The light reflected by the reflector is condensed by the focusing lens and is reflected to the image sensor by the reflective mirror.

Another exemplary embodiment of the invention provides an optical touch control system comprising a monitor, a light source bar, an image processor, and at least one image detection module. The light source bar surrounds the monitor and outputs light onto the monitor. The image detection module is adjacent to the monitor and comprises an image sensor and a reflective mirror. The image sensor is electrically connected to the image processor. The reflective mirror is disposed on the image sensor and inclines to the image sensor by a predetermined angle. The reflective mirror reflects the light output from the light source bar to the image sensor, identifying a touch control operation.

The image detection module further comprises a casing and at least one focusing lens. The casing covers the image sensor, reflective mirror, and focusing lens. The focusing lens is adjacent to the reflective mirror. The light output from the light source bar is condensed by the focusing lens and is reflected to the image sensor by the reflective mirror.

The predetermined angle is 45°.

The reflective mirror comprises a plane mirror, a convex mirror, or a concave mirror.

The image sensor is parallel to the monitor and does not protrude to the top of the monitor.

The image detection module further comprises a circuit board on which the image sensor is disposed and through which the image sensor is electrically connected to the image processor.

The image sensor and circuit board are parallel to the monitor and do not protrude to the top of the monitor.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
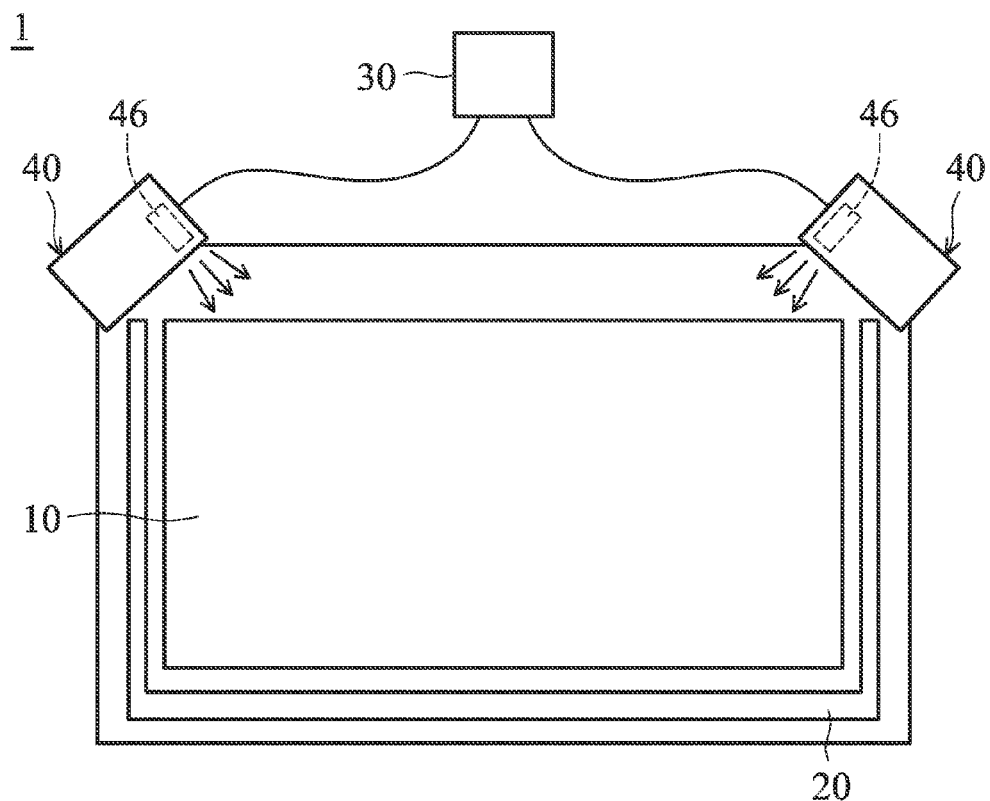
FIG. 1A is a schematic plane view of a conventional optical touch control system.
Figure 1B:
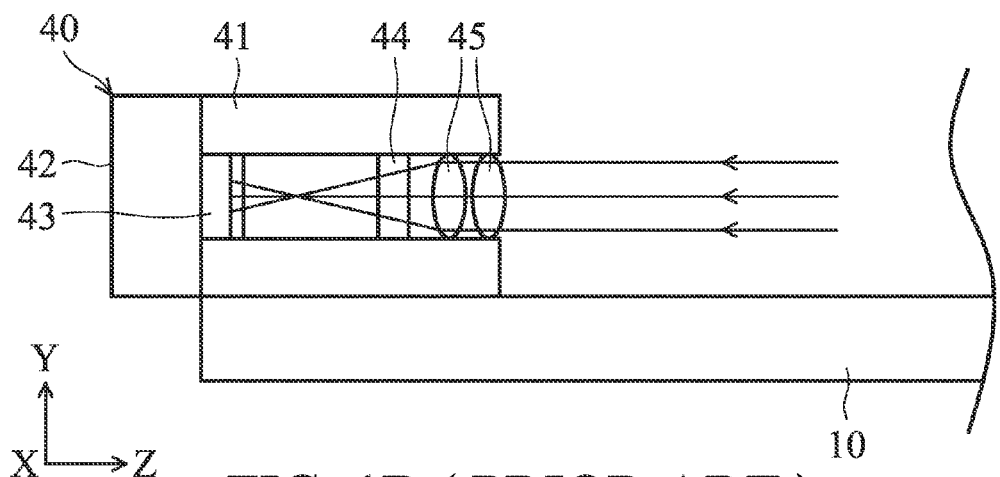
FIG. 1B is a partial cross section of the conventional optical touch control system.
Figure 2A:
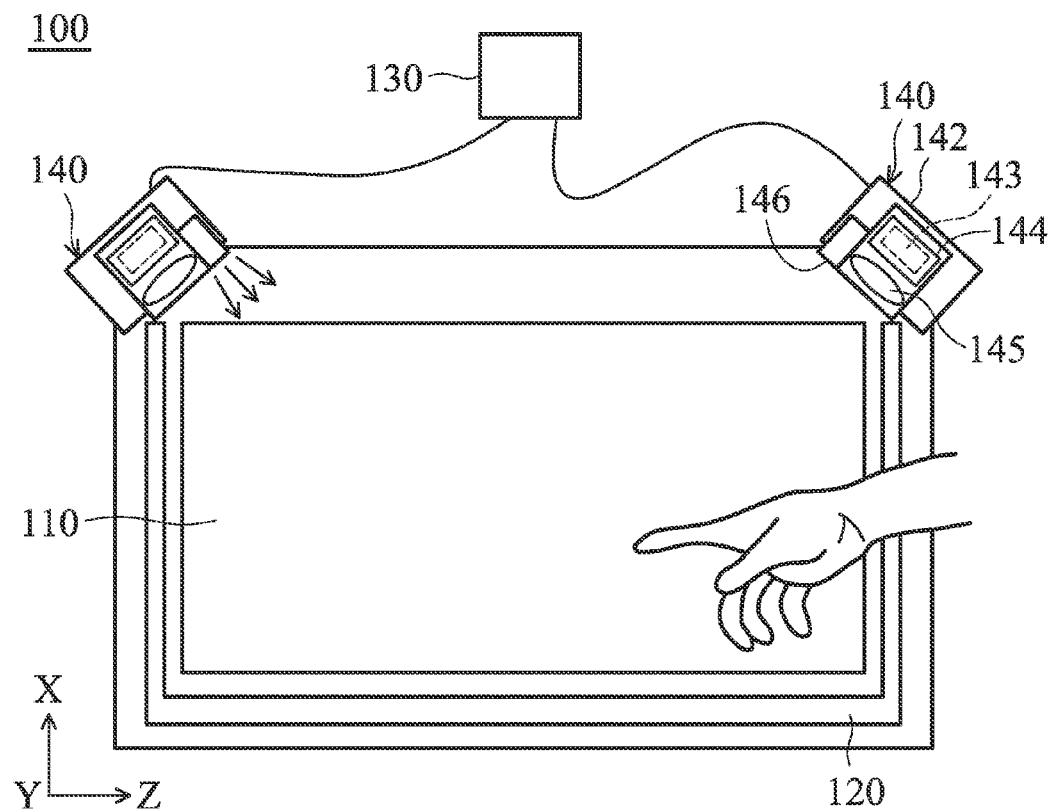
FIG. 2A is a schematic plane view of an optical touch control system of a first embodiment of the invention.
Figure 2B:
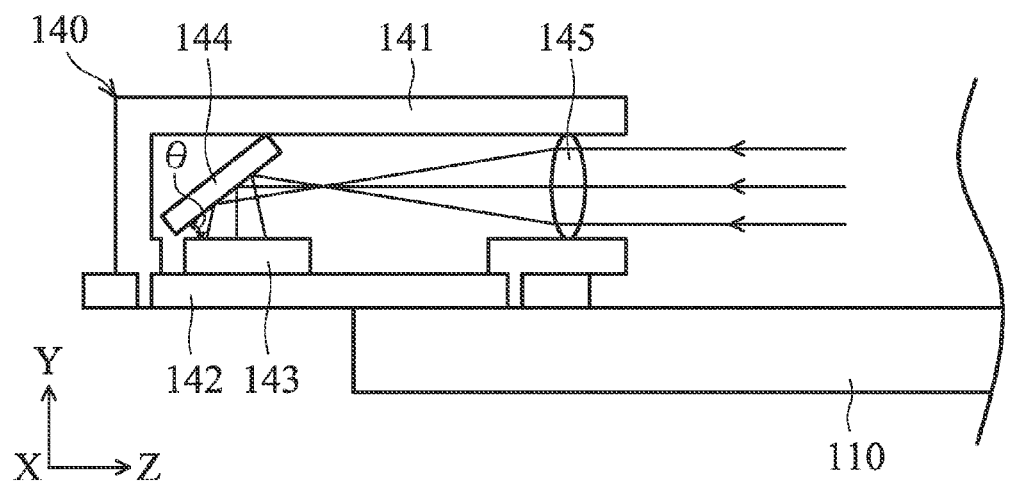
FIG. 2B is a partial cross section of the optical touch control system of FIG. 2A.

Referring to FIG. 2A and FIG. 2B, an optical touch control system 100 comprises a monitor 110, a reflector 120, an image processor 130, and two image detection modules 140.

As shown in FIG. 2A, the reflector 120 surrounds the monitor 110. In this embodiment, the reflector 120 is composed of a retro-reflective material for reflecting back incident light along an incident route.

The image detection modules 140 are adjacent to the monitor 110 and oppose each other. Here, as shown in FIG. 2A and FIG. 2B, each image detection module 140 comprises a casing 141, a circuit board 142, an image sensor 143, a reflective mirror 144, a focusing lens 145, and a light source 146.

The casing 141 covers the image sensor 143, reflective mirror 144, and focusing lens 145. Here, the casing 141 and circuit board 142 are engaged with each other and are disposed on the monitor 110.

The image sensor 143 is electrically connected to the image processor 130. Specifically, the image sensor 143 is disposed on the circuit board 142 and is electrically connected to the image processor 130 through the circuit board 142. In this embodiment, the image sensor 143 and circuit board 142 are parallel to (the top surface of) the monitor 110, as shown in FIG. 2B. Moreover, the image sensor 143 of this embodiment can receive infrared images (with a wavelength of 850 nm).

The reflective mirror 144 is disposed on the image sensor 143 and inclines to the image sensor 143 by a predetermined angle θ. For example, the predetermined angle θ may be 45° and is not limited thereto. Moreover, in addition to a plane mirror, the reflective mirror 144 may be a convex mirror or a concave mirror for changing optical magnification in a Y direction above the monitor 110. Specifically, as shown in FIG. 2D, when the reflective mirror 144 is a convex mirror 144a, a field of view in the Y direction above the monitor 110 can be increased, allowing a larger assembly tolerance in the Y direction for the optical touch control system 100. In another aspect, as shown in FIG. 2E, when the reflective mirror 144 is a concave mirror 144b, the field of view in the Y direction above the monitor 110 can be reduced, thereby providing functions of magnification for an image in the Y direction. Additionally, the reflective mirror 144 may be combined with a filter (not shown), allowing light with a specific single wavelength (e.g. infrared with a wavelength of 850 nm) to be reflected by the reflective mirror 144.

The focusing lens 145 is adjacent to the reflective mirror 144.

The light source 146 outputs light (e.g. the infrared with the wavelength of 850 nm) onto the monitor 110. Then, the reflective mirror 144 reflects the light reflected by the reflector 120 to the image sensor 143, identifying a touch control operation. Here, the light reflected by the reflector 120 is condensed by the focusing lens 145 and is then reflected to the image sensor 143 by the reflective mirror 144.

During operation of the optical touch control system 100, the incident light output from the light source 146 is reflected back by the reflector 120 along the incident route of the incident light and passes through the focusing lens 145 to be reflected by the reflective mirror 144. Then, the light is received by the image sensor 143. Here, by the image sensor 143 detecting interception of an optical path in any position on the monitor 110, identification of touch control can be obtained.

Accordingly, as the image sensor 143 and circuit board 142 of each image detection module 140 are parallel to (the top surface of) the monitor 110, the height of the entire optical touch control system 100 in the Y direction (i.e. the thickness of the entire optical touch control system 100) can be effectively reduced, benefiting development for further thinning the entire optical touch control system 100.

Figure 2C:
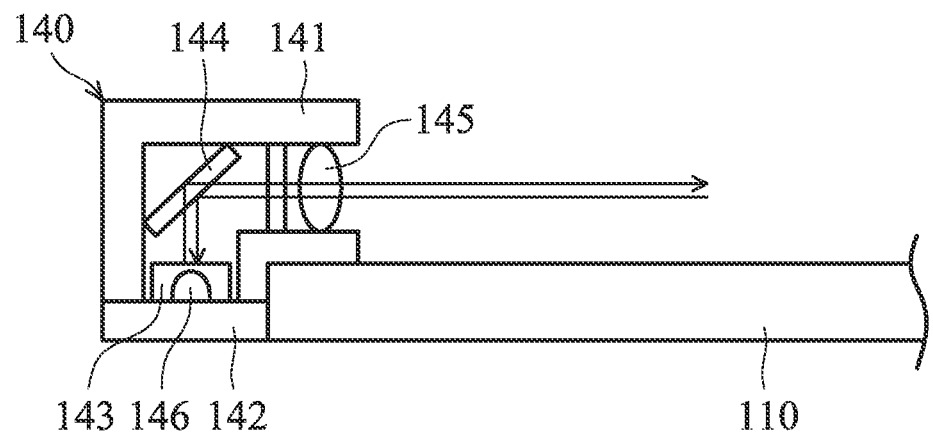
FIG. 2C is another partial cross section of the optical touch control system of FIG. 2A.
Figure 2D:
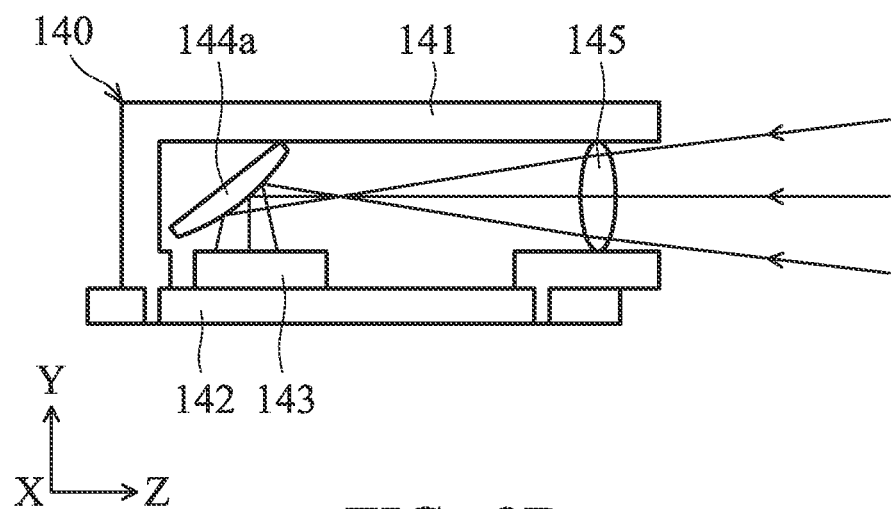
FIG. 2D is a cross section showing a variation of an image detection module of the optical touch control system of the first embodiment of the invention.
Figure 2E:
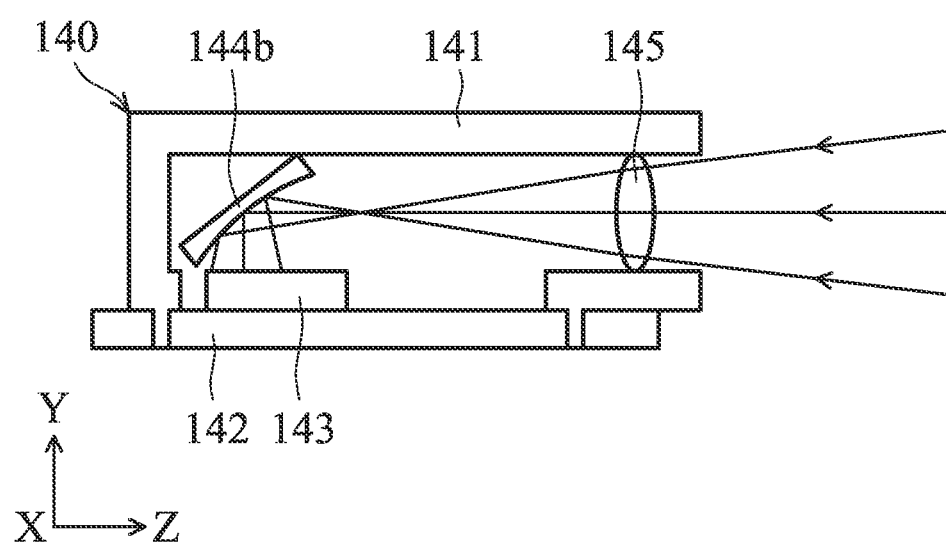
FIG. 2E is a cross section showing another variation of the image detection module of the optical touch control system of the first embodiment of the invention.

Moreover, to further reduce the height of the entire optical touch control system 100 in the Y direction, the image detection modules 140 and monitor 110 may be arranged in a form shown by FIG. 2C. Here, the image sensor 143 and circuit board 142 do not protrude to the top of the monitor 110. Namely, both of the image sensor 143 and circuit board 142 are disposed below the top of the monitor 110, such that the thickness of the entire optical touch control system 100 can be further reduced. Here, the light source 146 may be also disposed below the top of the monitor 110.

Second Embodiment

Elements corresponding to those in the first embodiment share the same reference numerals.

Figure 3A:
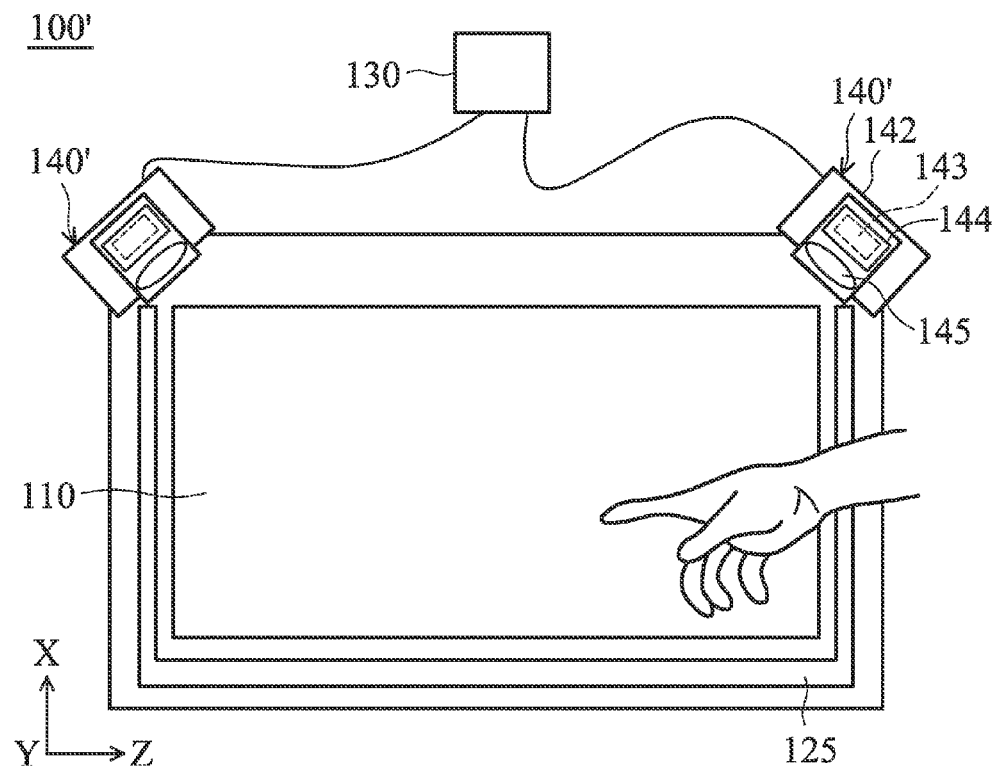
FIG. 3A is a schematic plane view of an optical touch control system of a second embodiment of the invention.
Figure 3B:
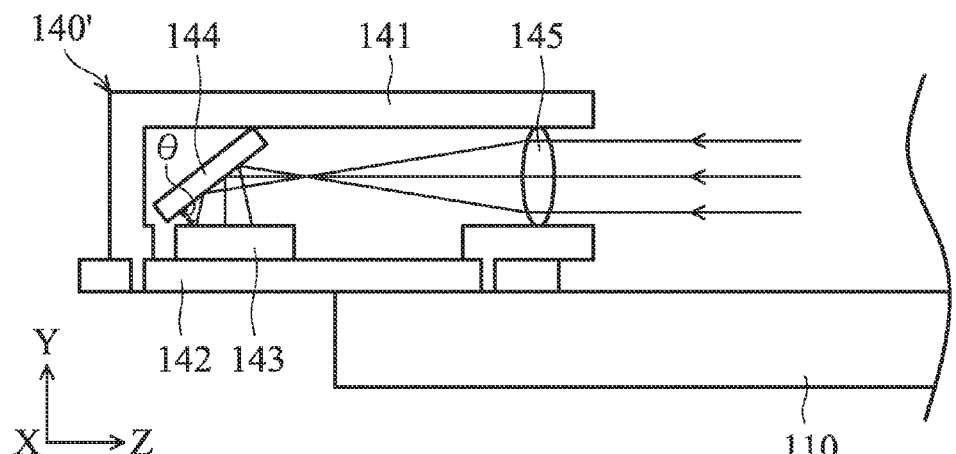
FIG. 3B is a partial cross section of the optical touch control system of FIG. 3A.

Referring to FIG. 3A and FIG. 3B, an optical touch control system 100' comprises a monitor 110, a light source bar 125, an image processor 130, and two image detection modules 140'.

As shown in FIG. 3A, the light source bar 125 surrounds the monitor 110 and outputs light (e.g. infrared with a wavelength of 850 nm) onto the monitor 110.

The image detection modules 140' are adjacent to the monitor 110 and oppose each other. Here, as shown in FIG. 3A and FIG. 3B, each image detection module 140' comprises a casing 141, a circuit board 142, an image sensor 143, a reflective mirror 144, and a focusing lens 145.

The reflective mirror 144 is disposed on the image sensor 143 and inclines to the image sensor 143 by a predetermined angle θ. For example, the predetermined angle θ may be 45° and is not limited thereto. Moreover, the reflective mirror 144 can reflect the light output by the light source bar 125 to the image sensor 143, identifying a touch control operation. Here, the light output from the light source bar 125 is condensed by the focusing lens 145 and is then reflected to the image sensor 143 by the reflective mirror 144.

During operation of the optical touch control system 100', the light output from the light source bar 125 passes through the focusing lens 145 to be reflected by the reflective mirror 144. Then, the light is received by the image sensor 143. Here, by the image sensor 143 detecting interception of an optical path in any position on the monitor 110, identification of touch control can be obtained.

Structure, disposition, and function of other elements in this embodiment are the same as those in the first embodiment, and explanation thereof is omitted for brevity.

Similarly, as the image sensor 143 and circuit board 142 of each image detection module 140 are parallel to (the top surface of) the monitor 110, the height of the entire optical touch control system 100' in the Y direction (i.e. the thickness of the entire optical touch control system 100') can be effectively reduced, benefiting development for further thinning the entire optical touch control system 100'.

Similar to the embodiment as shown in FIG. 2C, (though not depicted in FIG. 3), to further reduce the height of the entire optical touch control system 100' in the Y direction, the image sensor 143 and circuit board 142 may not protrude to the top of the monitor 110. Namely, both of the image sensor 143 and circuit board 142 do not protrude beyond the top of the monitor 110, such that the thickness of the entire optical touch control system 100' can be further reduced.

Figure 4:
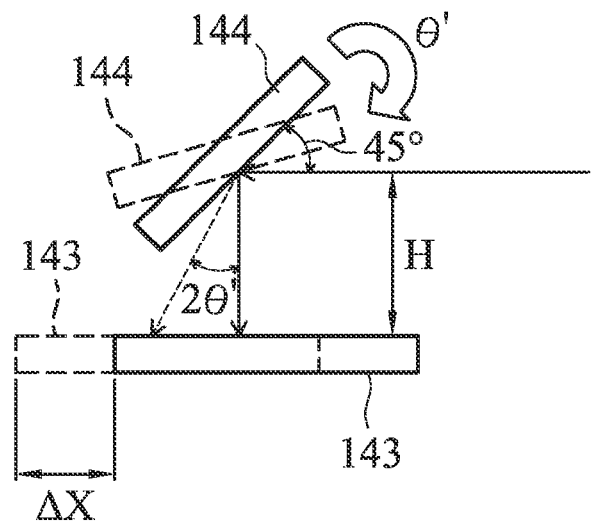
FIG. 4 shows a modified relation between the position of an image sensor and an inclined angle of a reflective mirror of the optical touch control system of the invention.
Figure 5:
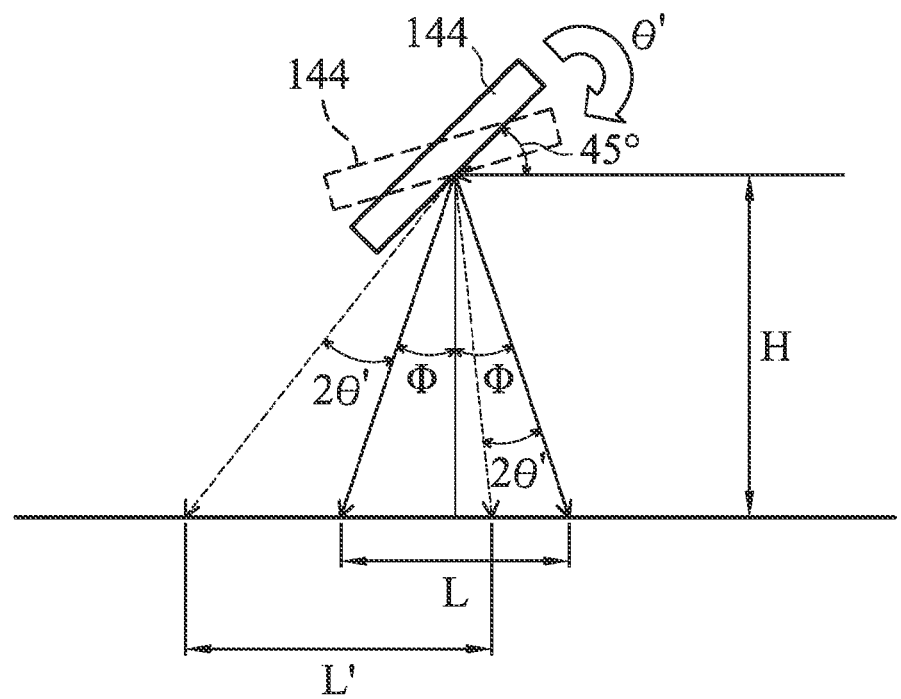
FIG. 5 shows a relation between the inclined angle of the reflective mirror and a corresponding imaging size.

Moreover, in the optical touch control systems 100 and 100', when the predetermined angle is not 45° (i.e. when the reflective mirror 144 does not incline to the image sensor 143 by 45°), two corresponding modified relations for the optical touch control systems 100 and 100' are shown in FIG. 4 and FIG. 5.

FIG. 4 shows a modified relation between the position of the image sensor 143 and an inclined angle of the reflective mirror 144. When the reflective mirror 144 is rotated clockwise by an angle $\theta'$ from the predetermined angle $\theta$, the reflected light is deviated by an angle $2\theta'$. At this point, the image sensor 143 needs to be leftward displaced by a distance $\Delta X = \tan 2\theta' \times H$, wherein H denotes a vertical height from the center of the reflective mirror 144 to the image sensor 143.

FIG. 5 shows a relation between the inclined angle of the reflective mirror 144 and a corresponding imaging size. When the predetermined angle $\theta$ is 45°, the width of an image imaged on the image sensor 143 is $L = \tan \Phi \times H + \tan \Phi \times H$, wherein an included angle between the width of the image and the reflective mirror 144 is $2\Phi$. When the reflective mirror 144 is rotated clockwise by the angle $\theta'$ from the predetermined angle $\theta$, the width of the image imaged on the image sensor 143 is $L' = \tan(\Phi + 2\theta') + \tan(\Phi - 2\theta')$. Accordingly, when the reflective mirror 144 is rotated clockwise by the angle $\theta'$, the width of the image imaged on the image sensor 143 is changed from L to L'. Therefore, the width of the image sensor 143 needs to be changed with the change in the width of the image.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical touch control system, comprising:
   a monitor;
   a reflector surrounding the monitor;
   an image processor; and
   at least one image detection module adjacent to the monitor and comprising an image sensor, a reflective mirror, a light source, and a circuit board, wherein the image sensor is disposed on the circuit board and electrically connected to the image processor through the circuit board, the reflective mirror is disposed on the image sensor and inclines to the image sensor by a predetermined angle, the light source outputs light onto a top surface of the monitor, and the reflective mirror reflects the light reflected by the reflector to a surface of the image sensor, identifying a touch control operation, wherein the surface of the image sensor and the circuit board are parallel to the top surface of the monitor, wherein a combined height of the image sensor and the circuit board does not exceed the top surface of the monitor.

2. The optical touch control system as claimed in claim 1, wherein the reflective mirror comprises a plane mirror, a convex mirror, or a concave mirror.

3. The optical touch control system as claimed in claim 1, wherein the image detection module further comprises a casing and at least one focusing lens, the casing covers the image sensor, reflective mirror, and focusing lens, the focusing lens is adjacent to the reflective mirror, and the light reflected by the reflector is condensed by the focusing lens and is reflected to the image sensor by the reflective mirror.

4. An optical touch control system, comprising:
   a monitor;
   a light source bar surrounding the monitor and outputting light onto a top surface of the monitor;
   an image processor; and
   at least one image detection module adjacent to the monitor and comprising an image sensor, a reflective mirror, and a circuit board, wherein the image sensor is disposed on the circuit board and electrically connected to the image processor through the circuit board, the reflective mirror is disposed on the image sensor and inclines to the image sensor by a predetermined angle, and the reflective mirror reflects the light output from the light source bar to a surface of the image sensor, identifying a touch control operation, wherein the surface of the image sensor and the circuit board are parallel to the top surface of the monitor, wherein a combined height of the image sensor and the circuit board does not exceed the top surface of the monitor.

5. The optical touch control system as claimed in claim 4, wherein the reflective mirror comprises a plane mirror, a convex mirror, or a concave mirror.

6. The optical touch control system as claimed in claim 4, wherein the image detection module further comprises a casing and at least one focusing lens, the casing covers the image sensor, reflective mirror, and focusing lens, the focusing lens is adjacent to the reflective mirror, and the light output from the light source bar is condensed by the focusing lens and is reflected to the image sensor by the reflective mirror.

* * * * *